United States Patent
Uehara

(10) Patent No.: US 8,701,473 B2
(45) Date of Patent: Apr. 22, 2014

(54) END-OF-LIFE ESTIMATION DEVICE FOR AIR CLEANER

(75) Inventor: Hideyo Uehara, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 12 days.

(21) Appl. No.: 13/491,257

(22) Filed: Jun. 7, 2012

(65) Prior Publication Data

US 2013/0036804 A1 Feb. 14, 2013

(30) Foreign Application Priority Data

Aug. 8, 2011 (JP) ................................. 2011-172906

(51) Int. Cl.
*G01M 15/04* (2006.01)

(52) U.S. Cl.
USPC .................. 73/114.31; 73/114.32; 73/114.37

(58) Field of Classification Search
USPC .............................. 73/114.31, 114.32, 114.37
See application file for complete search history.

(56) References Cited

U.S. PATENT DOCUMENTS

| | | | | |
|---|---|---|---|---|
| 5,604,306 | A * | 2/1997 | Schricker | 73/114.31 |
| 5,606,311 | A * | 2/1997 | Polidan et al. | 340/607 |
| 7,032,573 | B2 * | 4/2006 | Ardisana | 123/434 |
| 7,305,301 | B1 * | 12/2007 | Wang et al. | 701/114 |
| 7,441,449 | B2 * | 10/2008 | Wang et al. | 73/114.31 |
| 7,441,450 | B2 * | 10/2008 | McLain et al. | 73/114.37 |
| 7,444,234 | B2 * | 10/2008 | Bauerle | 701/114 |
| 7,509,845 | B2 * | 3/2009 | Wiggins et al. | 73/114.31 |
| 7,591,173 | B2 * | 9/2009 | Benscoter et al. | 73/114.33 |
| 7,631,551 | B2 * | 12/2009 | Wang et al. | 73/114.37 |
| 8,327,695 | B2 * | 12/2012 | Jackson et al. | 73/114.37 |
| 2005/0240338 | A1 | 10/2005 | Ardisana | |
| 2008/0229720 | A1 * | 9/2008 | Benscoter et al. | 55/290 |
| 2009/0025469 | A1 | 1/2009 | Wang et al. | |

FOREIGN PATENT DOCUMENTS

JP 58-15895 Y2 3/1983

* cited by examiner

*Primary Examiner* — Freddie Kirkland, III
(74) *Attorney, Agent, or Firm* — Arent Fox LLP

(57) ABSTRACT

An end-of-life estimation device for an air cleaner, which is capable of always accurately estimating an end of a service life of the air cleaner with an inexpensive construction, thereby enabling the air cleaner to be efficiently used until the service life comes close to the end. The end-of-life estimation device calculates a life parameter indicative of remaining service life of the air cleaner during running of an engine, on an as needed basis, and stores a relationship between the degree of clogging of the air cleaner, an intake air amount, and an intake parameter (an intake pressure on a downstream side of the air cleaner and/or a throttle valve opening). Further, the end-of-life estimation device calculates and updates a reference value with reference to which the life parameter is calculated, based on the stored relationship, according to the detected intake air amount and intake parameter.

6 Claims, 7 Drawing Sheets

FIG. 3

| θTH \ GAIR | GAIR1 | ········ | GAIRn |
|---|---|---|---|
| θTH1 | PNEW11 | ········ | PNEW1n |
| ⋮ | ⋮ | ⋱ | ⋮ |
| θTHm | PNEWm1 | ········ | PNEWmn |

FIG. 4

| θTH \ GAIR | GAIR1 | ········ | GAIRn |
|---|---|---|---|
| θTH1 | POLD11 | ········ | POLD1n |
| ⋮ | ⋮ | ⋱ | ⋮ |
| θTHm | POLDm1 | ········ | POLDmn |

END-OF-LIFE ESTIMATION DEVICE FOR AIR CLEANER

BACKGROUND OF THE INVENTION

1. Field of the Invention

The present invention relates to an end-of-life estimation device for an air cleaner, for determining a service life of the air cleaner that filters intake air drawn into an internal combustion engine, which is dependent on clogging of the air cleaner.

2. Description of the Related Art

Conventionally, as an estimation device for estimating the end of the service life of an air cleaner, one disclosed e.g. in Japanese Utility Model Registration Publication (Kokoku) No. S58-15895 is known. In this estimation device, attention is paid to the facts that negative pressure on the outlet side of a filter element of an air cleaner disposed in an intake passage is increased due to a loss of pressure of intake air during passing through the filter element, according to the degree of clogging of the filter element and the amount of the intake air, and that a ratio between the negative pressure on the outlet side of the filter element and negative pressure on the inlet side of the filter element becomes approximately constant irrespective of the intake air amount when the degree of clogging of the filter element is equal to a predetermined value.

From this point of view, in the above estimation device, the negative pressure on the outlet side of the filter element is detected by a first pressure converter, and the negative pressure on the inlet side of the filter element is detected by a second pressure converter. Further, an output from the second pressure converter is amplified at a predetermined ratio, and an output from the first pressure converter is compared with the amplified output from the second pressure converter by a comparator. As a consequence, when the output from the first pressure converter is smaller, the degree of clogging of the filter element is not larger than the above-mentioned predetermined value, and hence it is determined that the air cleaner has not reached the end of the service life yet, whereas when the output from the first pressure converter is larger, the degree of clogging of the filter element exceeds the predetermined value, and hence it is determined that the air cleaner has reached the end of the service life.

The above described conventional estimation device basically estimates the degree of clogging of the filter element based on the difference between negative pressure on the upstream side and negative pressure on the downstream side of the filter element, caused by the pressure loss occurring during passing of intake air through the filter element of the air cleaner, and thereby determines the end of the service life of the air cleaner. Therefore, when the intake air amount is small, the pressure loss in the filter element is small, and the difference between the negative pressures on the upstream side and the downstream side of the filter element becomes small, which makes it impossible to always accurately determine the end of the service life of the air cleaner. Further, it is required to dispose the second pressure converter, which is not normally disposed, on the inlet side of the air cleaner as a device dedicated for estimating the end of the service life of the air cleaner. This increases the number of component parts and manufacturing costs of the estimation device.

SUMMARY OF THE INVENTION

It is an object of the present invention to provide an end-of-life estimation device for an air cleaner, which is capable of always accurately estimating an end of a service life of the air cleaner with an inexpensive construction, thereby making it possible to efficiently use the air cleaner until the service life comes close to the end.

To attain the above object, the present invention provides an end-of-life estimation device for an air cleaner, which is disposed in an intake passage of an internal combustion engine, for estimating an end of a service life of the air cleaner that filters intake air drawn into the engine through the intake passage, which is dependent on clogging of the air cleaner, comprising life parameter-calculating means for calculating a life parameter indicative of a remaining service life of the air cleaner during running of the engine, on an as needed basis, intake air amount-detecting means for detecting an intake air amount, intake parameter-detecting means for detecting an intake parameter which is at least one of pressure of intake air on a downstream side of the air cleaner and an opening degree of a throttle valve for adjusting the intake air amount, storage means for storing a relationship between a degree of clogging of the air cleaner, the intake air amount, and the intake parameter, and reference value-updating means for calculating and updating a reference value with reference to which the life parameter-calculating means calculates the life parameter, based on the relationship stored in the storage means, according to the intake air amount and the detected intake parameter, when the detected intake air amount is not smaller than a predetermined value.

With the configuration of this end-of-life estimation device for the air cleaner, during running of the engine, the life parameter-calculating means calculates the life parameter indicative of the remaining service life of the air cleaner, on an as needed basis. Further, the storage means stores the relationship between the degree of clogging of the air cleaner, the intake air amount, and the intake parameter. The intake parameter is at least one of pressure of intake air on a downstream side of the air cleaner (hereinafter referred to as the "intake pressure"), and the opening degree of the throttle valve.

When intake air is passed through the air cleaner clogged, a pressure loss is caused at the air cleaner depending on the degree of clogging and the amount of the intake air, and the intake pressure is lowered by the pressure loss. Therefore, when the intake air amount and the intake pressure are determined, the degree of clogging of the air cleaner is approximately determined. Further, in a case where a throttle valve is provided in the intake passage, the intake air amount changes with the opening degree of the throttle valve and the degree of clogging of the air cleaner, and therefore when the intake air amount and the throttle valve opening are determined, the degree of clogging of the air cleaner is approximately determined.

From this point of view, according to the present invention, the intake air amount and the above-mentioned intake parameter (intake pressure and/or throttle valve opening) are detected, and the reference value with reference to which the life parameter-calculating means calculates the life parameter is calculated and updated, according to the detected intake air amount and intake parameter, based on the relationship stored in the storage means. Further, the reference value is updated on condition that the detected intake air amount is not smaller than a predetermined value, that is, in a state in which the amounts of change in the intake pressure and the intake air amount, which are dependent on the degree of clogging of the air cleaner, are large. Therefore, it is possible to accurately calculate and update the reference value while favorably causing the actual degree of clogging of the air cleaner to be reflected on the reference value.

Further, the life parameter is calculated with reference to the updated reference value, on an as needed basis, so that even when the calculation accuracy of the life parameter calculated by the life parameter-calculating means is not very high, the calculation accuracy of the life parameter can be maintained by referring to the reference value having higher accuracy. As a consequence, it is possible to always accurately estimate the end of the service life of the air cleaner based on the calculated life parameter, and it is possible to efficiently use the air cleaner until the service life comes close to the end, based on the estimation result.

Further, the intake air amount and the intake pressure and/or the throttle valve opening used for updating the reference value are normally used as parameters for controlling the engine. This makes it possible to realize the end-of-life estimation device according to the present embodiment with an inexpensive construction while using existing detection means for detecting these parameters.

Preferably, the intake parameter-detecting means detects the opening degree of the throttle valve as the intake parameter, and the reference value-updating means updates the reference value when the intake air amount is not smaller than the predetermined value, and at the same time the detected opening degree of the throttle valve is not smaller than a predetermined opening degree.

With the configuration of the preferred embodiment, the reference value of the life parameter is calculated on condition that the intake air amount is not smaller than the predetermined value, and further the detected throttle valve opening is not smaller than the predetermined opening degree. Therefore, the reference value of the life parameter can be calculated and updated in a state in which the amounts of change in the intake pressure and the intake air amount dependent on the degree of clogging of the air cleaner are larger, thereby making it possible to further enhance the accuracy of the reference value.

Preferably, the end-of-life estimation device further comprises intake air amount integrated value-calculating means for calculating an integrated value of the intake air amount, and the life parameter-calculating means calculates the life parameter according to the calculated integrated value of the intake air amount.

With the configuration of the preferred embodiment, the life parameter can be calculated only by using the intake air amount detected by the intake air amount-detecting means and calculating the integrated value of the intake air amount, so that it is possible to reduce the number of component parts and manufacturing costs of the end-of-life estimation device.

Preferably, the engine is installed on a vehicle, as a motive power source, and the end-of-life estimation device further comprises traveled distance integrated value-calculating means for calculating an integrated value of a distance traveled of the vehicle, the life parameter-calculating means calculating the life parameter according to the calculated integrated value of the distance traveled of the vehicle.

With the configuration of the preferred embodiment, the life parameter can be calculated only by determining the traveled distance of the vehicle and calculating the integrated value of the traveled distance, so that it is possible to reduce the number of component parts and manufacturing costs of the end-of-life estimation device.

The above and other objects, features, and advantages of the present invention will become more apparent from the following detailed description taken in conjunction with the accompanying drawings.

BRIEF DESCRIPTION OF THE DRAWINGS

FIG. 3 is a map for use in calculation of a new condition-time intake pressure in the end-of-life determination process.

FIG. 4 is a man for use in calculation of an end-of-life-time intake pressure in the end-of-life determination process.

DETAILED DESCRIPTION OF PREFERRED EMBODIMENTS

Figure 1:
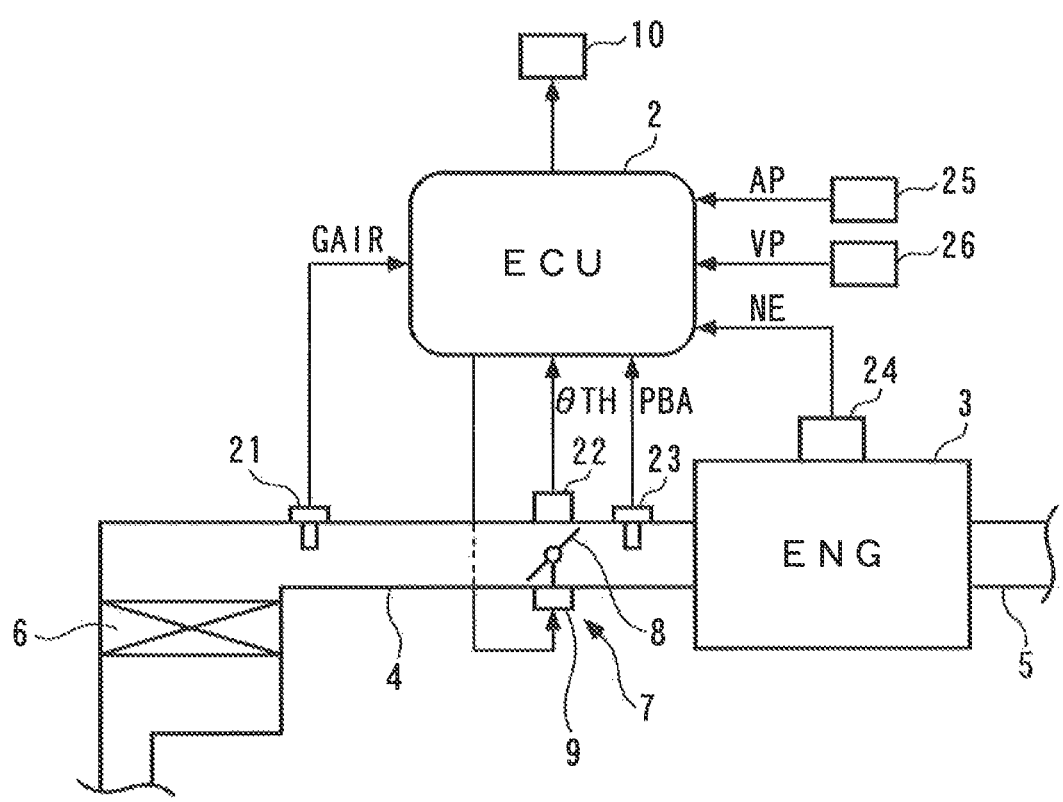
FIG. 1 is a schematic view of an end-of-life estimation device for an air cleaner according to the present invention and an internal combustion engine incorporating the same.

The invention will now be described in detail with reference to drawings showing a preferred embodiment thereof. FIG. 1 shows an internal combustion engine (hereinafter referred to as the "engine") 3 to which the present invention is applied. The engine 3 is a gasoline engine installed on a vehicle, not shown. An intake passage 4 and an exhaust passage are connected to the engine 3.

The intake passage 4 is provided with an air cleaner 6 at a location upstream of the intake passage 4. The air cleaner 6 includes a filter element (not shown) disposed in a manner blocking the intake passage 4. When intake air drawn into the engine 3 passes through the air cleaner 6, the filter element traps dust and the like from the intake air, thereby filtering the intake air.

Further, the intake passage 4 is provided with a throttle valve mechanism 7 at a location downstream of the air cleaner 6. The throttle valve mechanism 7 comprises a pivotally-movable throttle valve 8 disposed in the intake passage 4, an actuator 9 for actuating the throttle valve 8, and so forth. The opening degree $\theta TH$ of the throttle valve 8 (hereinafter referred to as the "throttle valve opening $\theta TH$") is controlled by controlling the duty ratio of current supplied to the actuator 9 by an ECU 2, whereby an intake air amount GAIR is adjusted.

An air flow sensor 21 disposed at a location immediately downstream of the air cleaner 6 detects the intake air amount GAIR, and delivers a signal indicative of the detected intake air amount GAIR to the ECU 2. Further, a throttle valve opening sensor 22 detects the throttle valve opening $\theta TH$, and delivers a signal indicative of the detected throttle valve opening $\theta TH$ to the ECU 2

Furthermore, the intake passage 4 is provided with an intake pressure sensor 23 at a location downstream of the throttle valve 8. The intake pressure sensor 23 detects the pressure PBA of intake air (hereinafter referred to as the "intake pressure PBA") as an absolute pressure, and delivers a signal indicative of the detected intake pressure PBA to the ECU 2.

Further, delivered to the ECU 2 are a detection signal indicative of a rotational speed NE of the engine 3 (hereinafter referred to as the "engine speed NE") from an engine speed sensor 24, a detection signal indicative of a stepped-on amount AP of an accelerator pedal (not shown) (hereinafter referred to as the "accelerator pedal opening AP") from an accelerator pedal opening sensor 25, and a detection signal indicative of a speed VP of the vehicle (hereinafter referred to as the "vehicle speed VP") from a vehicle speed sensor 26. Further, a warning light 10 for warning a driver that the air cleaner 6 has reached the end of a service life thereof is connected to the ECU 2.

The ECU 2 is implemented by a microcomputer comprising a CPU, a RAM, a ROM and an I/O interface (none of which are specifically shown). The ECU 2 determines operating conditions of the engine 3 and the vehicle based on the detection signals from the aforementioned sensors 21 to 26, and depending on the determined operating conditions of the engine 3 and the vehicle, executes various control processes, such as a process for controlling the amount of fuel injected into the engine 3, and a process for controlling the amount of intake air drawn into the engine 3 via the throttle valve 8.

Particularly in the present embodiment, the ECU 2 executes an end-of-life determination process for determining the end of the service life of the air cleaner 6. In the present embodiment, the ECU 2 corresponds to life parameter-calculating means, storage means, reference value-updating means, intake air amount integrated value-calculating means, and traveled distance integrated value-calculating means.

Figure 2:
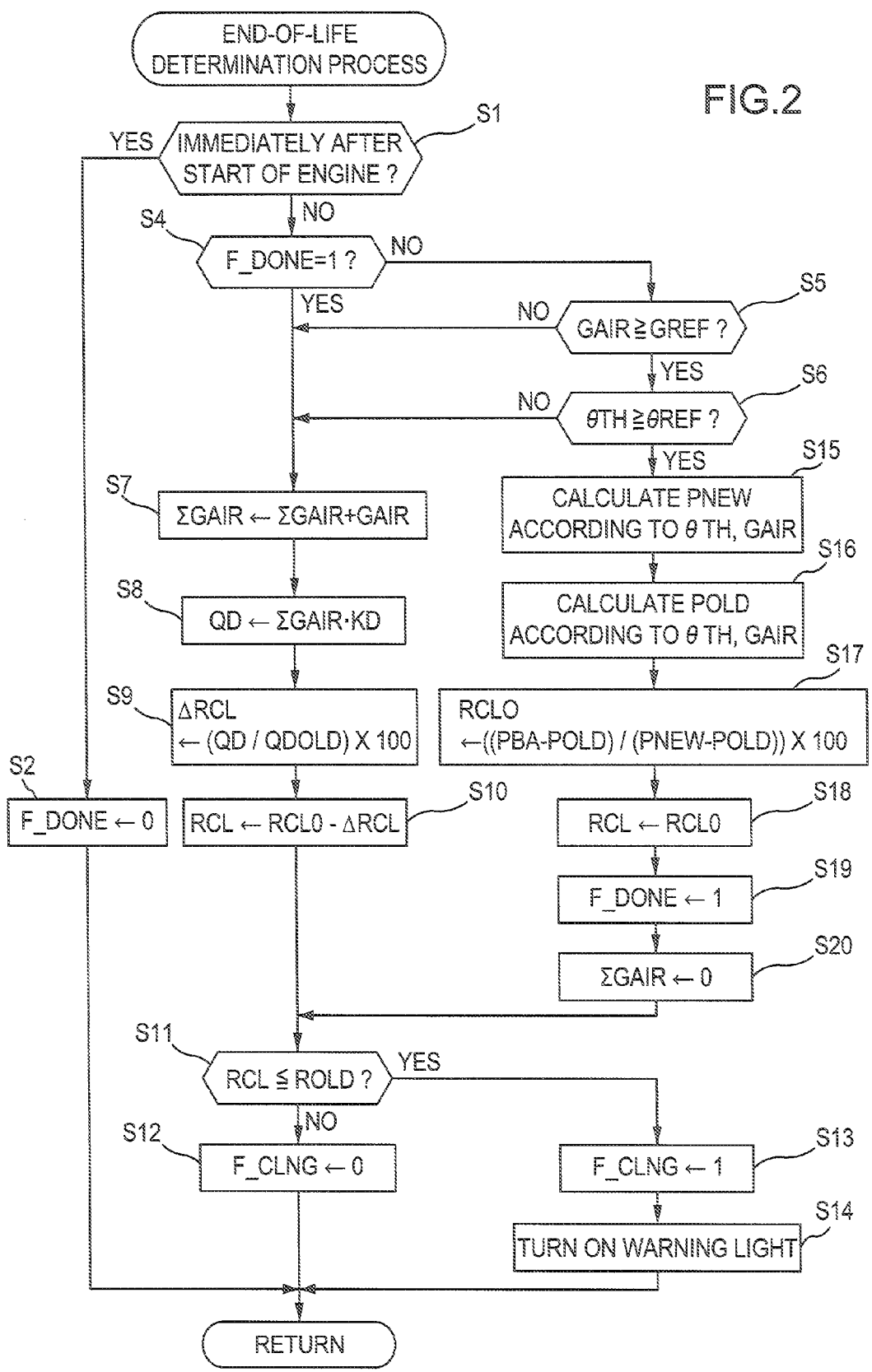
FIG. 2 is a flowchart of an end-of-life determination process for determining the end of the service life of the air cleaner.

FIG. 2 shows the end-of-life determination process. This process is for calculating a life parameter RCL indicative of remaining service life of the air cleaner 6, which is dependent on clogging of the air cleaner 6 caused by dust and the like, on an as needed basis, and determining the end of the service life of the air cleaner 6 based on the calculated life parameter RCL. The end-of-life determination process is repeatedly executed at a predetermined repetition period $\Delta T$.

In the present process, first, in a step 1 (shown as "S1" in FIG. 2; the following steps are also shown in the same way), it is determined whether or not the present loop is immediately after the start of the engine 3. If the answer to this question is affirmative (YES), i.e. if the present loop is immediately after the start of the engine 3, a reference value update completion flag F_DONE, referred to hereinafter, is reset to 0 (step 2), followed by terminating the present process.

If the answer to the question of the above-described step 1 is negative (NO), i.e. if the present loop is not immediately after the start of the engine 3, it is determined whether or not the reference value update completion flag F_DONE is equal to 1 (step 4). By executing the above-described step 2, the answer to the question of the step 4 becomes negative (NO) immediately after the start of the engine 3. In this case, it is determined whether or not the detected intake air amount. GAIR is not smaller than a predetermined threshold value GREF (step 5), and it is determined whether or not the detected throttle valve opening $\theta TH$ is not smaller than a predetermined threshold value $\theta REF$ (step 6).

If any of the answers to these questions is negative (NO), i.e. if GAIR<GREF or $\theta TH<\theta REF$ holds, in a step 7 et seq., the life parameter RCL is calculated based on an intake air amount integrated value $\Sigma GAIR$. The life parameter RCL represents the remaining service life of the air cleaner 6 dependent on clogging of the air cleaner 6 as a percentage. More specifically, the life parameter RCL represents that as the value of the life parameter RCL is smaller, the degree of clogging of the air cleaner 6 is higher, and the remaining service life of the air cleaner 6 is shorter. Further, when the air cleaner 6 is replaced, the life parameter RCL and a reference value RCL0 thereof are reset to 100%, and the intake air amount integrated value $\Sigma GAIR$ is reset to 0.

First, in the step 7, the current intake air amount integrated value $\Sigma GAIR$ is calculated by adding the currently detected intake air amount GAIR to the intake air amount integrated value $\Sigma GAIR$ integrated up to the immediately preceding loop. Next, an estimated trapped dust amount QD is calculated by multiplying the calculated intake air amount integrated value $\Sigma GAIR$ by a predetermined dust concentration coefficient KD (step 8). The dust concentration coefficient KD corresponds to a concentration of dust in intake air, trapped by the air cleaner 6, and is set assuming the most severe vehicle use environment, such as a construction site Further, the estimated trapped dust amount QD represents an amount of dust estimated to have been trapped by the air cleaner 6 during calculation of the intake air amount integrated value $\Sigma GAIR$.

Next, a decreased amount $\Delta RCL$ of the life parameter is calculated by dividing the calculated estimated trapped dust amount QD by a predetermined limit dust amount QDOLD (step 9). The limit dust amount QDOLD corresponds to an amount of dust trapped by the air cleaner 6 of which clogging has reached its limit and hence which has reached the end of the service life. Therefore, the decreased amount $\Delta RCL$ calculated in the above-mentioned step 9 represents a decreased amount of the life parameter RCL during calculation of the intake air amount integrated value $\Sigma GAIR$. Next, the life parameter RCL at the time point is calculated by subtracting the calculated decreased amount. $\Delta RCL$ from the reference value RCL0 of the life parameter (step 10).

Then, it is determined whether or not the calculated life parameter RCL is not larger than a predetermined threshold value ROLD (step 11). If the answer to this question is negative (NO), i.e. if RCL>ROLD holds, it is determined that the air cleaner 6 has not reached the end of the service life yet, and an end-of-life flag F_CLNG is set to 0 (step 12), followed by terminating the present process.

On the other hand, if the answer to the question of the above-described step 11 is affirmative (YES), i.e. if the life parameter RCL has become equal to or smaller than the threshold value ROLD, it is determined that the air cleaner 6 has reached the end of the service life, and to indicate the fact, the end-of-life flag F_CLNG is set to 1 (step 13), and the warning light 10 is turned on (step 14), followed by terminating the present process.

On the other hand, if both of the answers to the questions of the above-described steps 5 and 6 are affirmative (YES), i.e. if the intake air amount. GAIR is not smaller than the threshold value GREF, and at the same time the throttle valve opening $\theta TH$ is not smaller than the threshold value $\theta REF$, it is determined that predetermined conditions are satisfied, and in a step 15 et seq., the reference value RCL0 of the life parameter RCL is calculated.

First, in the step 15 and a step 16, a new condition-time intake pressure PNEW and an end-of-life-time intake pressure POLD are calculated by searching respective maps shown in FIGS. 3 and 4 according to the throttle valve opening $\theta TH$ and the intake air amount. GAIR.

The above-mentioned new condition-time intake pressure PNEW corresponds to a value of the intake pressure PBA obtained when the air cleaner 6 is new and has no clogging at all. The map shown in FIG. 3 is formed by empirically determining the relationship of the new condition-time intake pressure PNEW to the throttle valve opening $\theta TH$ and the intake air amount GAIR, with respect to various values of these parameters, in advance e.g. by experiment, and mapping the same. Further, the end-of-life-time intake pressure POLD corresponds to a value of the intake pressure PBA obtained when the air cleaner 6 has reached the end of the service life due to clogging. The map shown in FIG. 4 is formed by empirically determining the relationship of the end-of-life-time intake pressure POLD to the throttle valve openings θTH and the intake air amounts GAIR, with respect to the various values of these parameters, in advance e.g. by experiment, and mapping the same.

Figure 5:
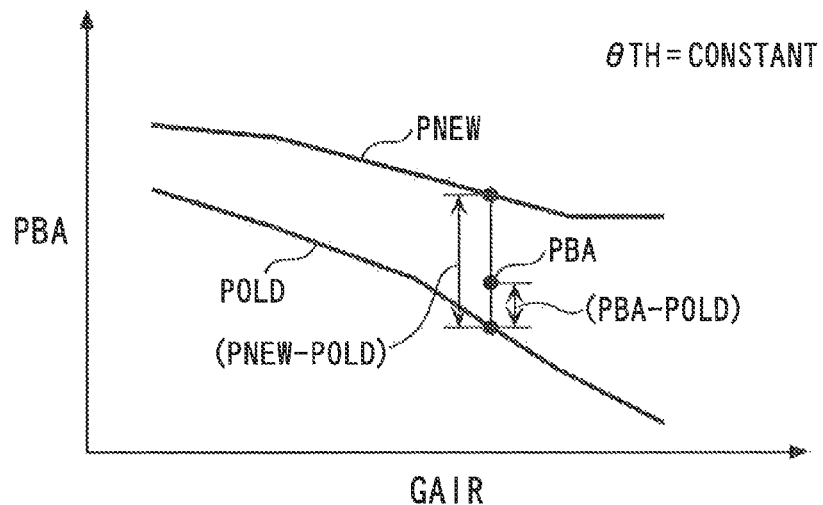
FIG. 5 is a view showing a relationship between an intake air amount, the new condition-time intake pressure, and the end-of-life-time intake pressure, exhibited when a throttle valve opening is constant.

FIG. 5 shows an example of the above-described relationship, i.e. the relationship between the intake air amount GAIR, the new condition-time intake pressure PNEW, and the end-of-life-time intake pressure POLD, obtained when the throttle valve opening θTH takes a relatively large constant value. As shown in FIG. 5, when the throttle valve opening θTH is constant, pressure loss of the air cleaner 6 becomes larger as the intake air amount GAIR is larger, and hence the intake pressure PBA becomes smaller. Further, the pressure loss is smallest when the air cleaner 6 is new, whereas as clogging of the air cleaner 6 proceeds, the pressure loss becomes larger. Therefore, provided that the throttle valve opening θTH and the intake air amount. GAIR are the same, the new condition-time intake pressure PNEW exhibits the maximum value, and the end-of-life-time intake pressure POLD exhibits the minimum value.

Further, although not shown, as the throttle valve opening θTH is smaller, adverse influence of negative pressure caused by the throttling of the throttle valve 8 becomes larger, so that both of the new condition-time intake pressure PNEW and the end-of-life-time intake pressure POLD become smaller. The maps illustrated in FIGS. 3 and 4 are set according to the above-described characteristics. Further, when the detected throttle valve opening θTH and/or the intake air amount GAIR are/is different from any of map grid values (θTH1 to θTHm and/or GAIR1 to GAIRn) shown in FIGS. 3 and 4, the new condition-time intake pressure PNEW and/or the end-of-life-time intake pressure POLD are/is calculated by interpolation.

In a step 17 following the step 16 illustrated in FIG. 2, the reference value RCL0 of the life parameter RCL is calculated using the new condition-time intake pressure PNEW and the end-of-life-time intake pressure POLD, calculated as described above, and the detected intake pressure PBA by the following equation (1):

$$RCL0=((PBA-POLD)/(PNEW-POLD)) \times 100 \qquad (1)$$

In this equation (1), a denominator on the right side is the difference between the new condition-time intake pressure PNEW and the end-of-life-time intake pressure POLD, and corresponds to a range of change in the intake pressure PBA which can occur from when the air cleaner 6 starts to be used in a new condition to when it reaches the end of the service life. Further, a numerator on the right side of the equation (1) is the difference between the current intake pressure PBA and the end-of-life-time intake pressure POLD, and corresponds to a range of change in the intake pressure PBA which can occur from now to when the current air cleaner 6 reaches the end of the service life. Because of the above-described relationship, as shown in FIG. 5, the entire right side of the equation (1) corresponds to a ratio of the remaining service life of the air cleaner 6 to the whole service life of the same, and therefore the right side of the equation (1) is calculated and updated as the reference value ROL0 of the life parameter at the present time point.

Next, the updated reference value RCL0 is set as the life parameter RCL (step 18), and to indicate that the update of the reference value RCL0 has been completed, the reference value update completion flag F_DONE is set to 1 (step 19). Further, after resetting the intake air amount integrated value ΣGAIR to 0 (step 20), the process proceeds to the above-described step 11 et seq. Therefore, at this time, the determination of the service life in the step 11 is carried out using the life parameter RCL set in the above-described step 18.

Further, after the reference value RCL0 has been updated, as described above, the reference value update completion flag F_DONE is set to 1 in the step 19, and accordingly the answer to the question of the above-described step 4 becomes affirmative (YES). In this case, the process directly proceeds to the step 7 et seq., wherein the intake air amount integrated value ΣGAIR is calculated (step 7) and the life parameter RCL is calculated based on the intake air amount integrated value ΣGAIR (steps 8 to 10).

As is apparent from the above, the update of the reference value RCL0 of the life parameter RCL in the steps 15 to 19 is performed only once in one whole running cycle of the engine 3 when predetermined conditions are satisfied. Further, the intake air amount integrated value ΣGAIR is reset to 0 at the time of the update of the reference value RCL0 of the life parameter RCL (step 20), and accordingly, the calculation of the intake air amount integrated value ΣGAIR in the step 7 and the calculations of the estimated trapped dust amount QD and the decreased amount ΔRCL of the life parameter in the steps of 8 and 9 are carried out only during a time period after the update of the reference value RCL0 of the life parameter RCL. Then, the life parameter RCL is calculated by subtracting the calculated decreased amount ΔRCL from the reference value RCL0, i.e. with reference to the updated reference value RCL0 (step 10).

Figure 6:
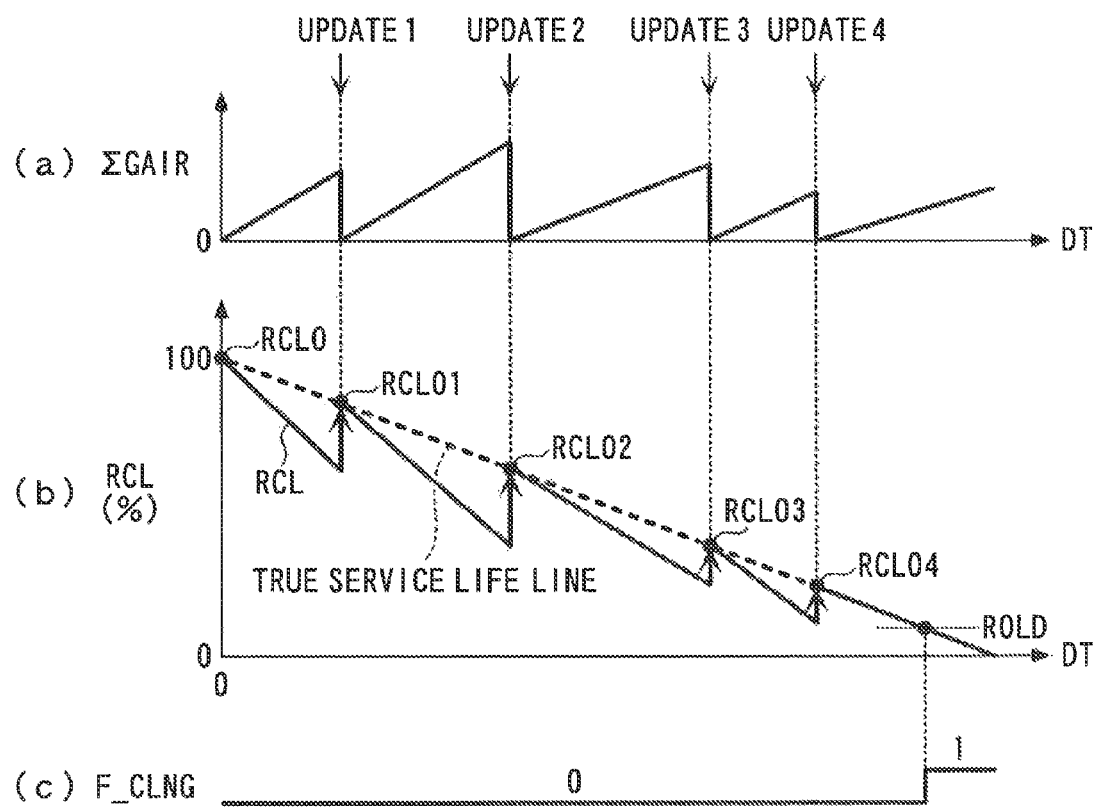
FIG. 6 is a view showing an example of an operation provided by the end-of-life determination process.

FIG. 6 is a view showing an example of an operation provided by the above-described end-of-life determination process. In FIG. 6, the horizontal axis represents a distance traveled DT of the vehicle after the air cleaner 6 is replaced by a new-condition one Note that although the reference value RCL0 of the life parameter RCL is updated when the predetermined conditions are satisfied, with frequency dependent on the end-of-life determination process described above, FIG. 6 illustrates an example in which the number of times of updating the reference value RCL0 is four, for convenience of illustration and description.

When the air cleaner 6 is replaced (DT=0), the life parameter RCL and the reference value RCL0 are reset to 100%, and the intake air amount integrated value ΣGAIR is reset to 0. Thereafter, the intake air amount integrated value ΣGAIR is calculated on an as needed basis along with traveling of the vehicle (step 7), and the estimated trapped dust amount QD and the decreased amount ΔRCL of the life parameter are calculated in a manner proportional to the intake air amount integrated value ΣGAIR (steps 8 and 9). Then, the decreased amount ΔRCL is subtracted from the reference value RCL0 (100%, in this case), whereby the life parameter RCL is calculated on an as needed basis such that the life parameter RCL is progressively decreased from 100% in proportion to the intake air amount integrated value ΣGAIR (step 10).

When the conditions of the above-described intake air amount GAIR and the throttle valve opening θTH are satisfied in this state (YES to the steps 5 and 6), a first update of the reference value RCL0 (update 1) is performed (steps 15 to 18). Specifically, the reference value RCL0 (=RCL01) is calculated and updated based on the detected intake pressure PBA by the equation (1), and the life parameter. RCL is set to the updated reference value RCL0. This causes the life parameter RCL and the reference value RCL0 to be corrected to values close to a true service life line indicated by a broken line.

Then, the calculation of the intake air amount integrated value ΣGAIR from 0 to which the intake air amount integrated value ΣGAIR is reset in the step 20, and the calculation of the decreased amount ΔRCL of the life parameter based on the calculated intake air amount integrated value ΣGAIR are performed on an as needed basis, and by subtracting the decreased amount ΔRCL from the reference value RCL0, the life parameter RCL is calculated such that the life parameter RCL is progressively decreased from the updated reference value RCL0.

After that, whenever the update conditions are satisfied, similarly to the above, second to fourth updates of the reference value RCL0 (update 2 to update 4) are performed (RCL0=RCL02 to RCL04), and by subtracting the decreased amount ΔRCL of the life parameter, which is calculated after each update of the reference value RCL0, from the reference value RCL0, the life parameter RCL is calculated such that the life parameter RCL is progressively decreased with reference to the updated reference value RCL0.

Then, when the life parameter RCL is decreased to a value not larger than the threshold value ROLD (YES to the step 11), it is determined that the air cleaner 6 has reached the end of the service life, so that the end-of-life flag F_CLNG is set to 1 (step 13) and the warning light 10 is turned on (step 14) to thereby give a warning to the driver.

As described hereinabove, according to the present embodiment, the reference value ROM of the life parameter RCL is calculated and updated based on the detected intake air amount GAIR, intake pressure PBA, and throttle valve opening θTH. Further, the update of the reference value RCL0 is performed on condition that the intake air amount GAIR is not smaller than the threshold value GREF and at the same time the throttle valve opening θTH is not smaller than the threshold value θREF. Therefore, it is possible to accurately calculate and update the reference value RCL0 while favorably causing the actual degree of clogging of the air cleaner 6 to be reflected on the reference value RCL0.

Further, the life parameter RCL is calculated on an as needed basis, with reference to the updated reference value RCL0, so that even when the calculation accuracy of the life parameter RCL based on the intake air amount integrated value ΣGAIR is not very high, the calculation accuracy of the life parameter RCL can be maintained by referring to the reference value RCL0 having higher accuracy. As a consequence, it is possible to always accurately estimate the end of the service life of the air cleaner 6 based on the calculated life parameter RCL, thereby making it possible to efficiently use the air cleaner 6 until the service life comes close to the end, based on the estimated service life.

Further, the intake air amount GAIR, the throttle valve opening θTH, and the intake pressure PBA, which are used for updating the reference value RCL0, are normally used as parameters for controlling the engine 3. This makes it possible to realize the end-of-life estimation device according to the present embodiment with an inexpensive construction while using the air flow sensor 21, the throttle valve opening sensor 22, and the intake pressure sensor 23, which are existing detection means for detecting the above-mentioned parameters.

Furthermore, since the life parameter RCL is calculated according to the intake air amount integrated value ΣGAIR, it is possible to calculate the life parameter RCL using the intake air amount GAIR detected by the air flow sensor 21, and therefore it is possible to reduce the number of component parts and manufacturing costs of the end-of-life estimation device.

Figure 7:
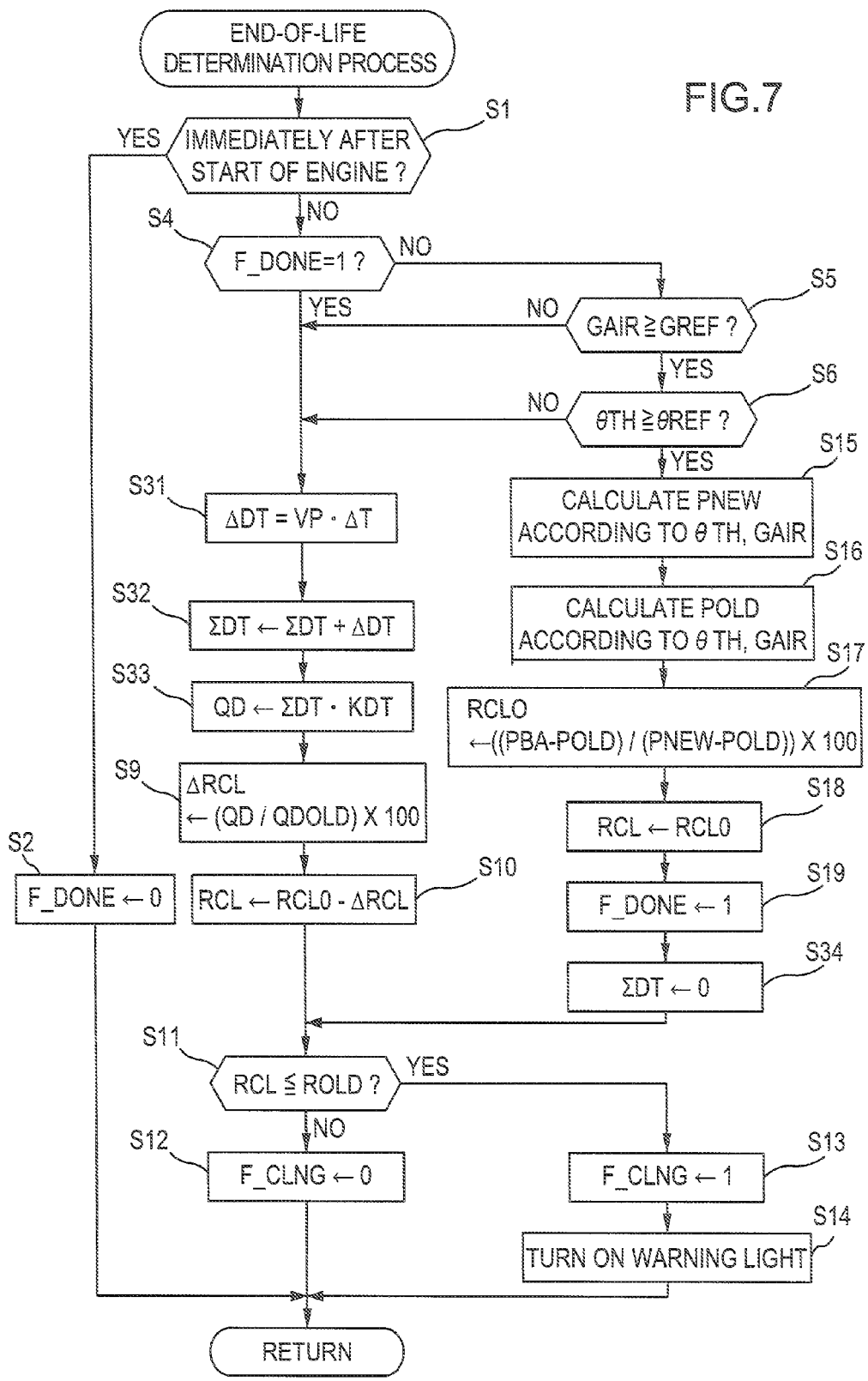
FIG. 7 is a flowchart of a variation of the end-of-life determination process.

FIG. 7 shows a variation of the end-of-life determination process for determining the end of the service life of the air cleaner 6. This variation is distinguished from the FIG. 2 end-of-life determination process only in that the decreased amount ΔRCL of the life parameter RCL is calculated according to a traveled distance integrated value ΣDT in place of the intake air amount integrated value ΣGAIR. For this reason, the same steps as those of the end-of-life determination process in FIG. 2 are denoted by the same step numbers in FIG. 7, and the following description is given mainly of different steps from the end-of-life determination process in FIG. 2.

In the present process, if the answer to the question of the above-described step 4 is affirmative (YES), i.e. if the update of the reference value RCL0 of the life parameter RCL has been completed, or if the answer to the question of the above-described step 5 or 6 is negative (NO), i.e. if the intake air amount GAIR is smaller than the threshold value GREF, or the throttle valve opening θTH is smaller than the threshold value θREF, a distance traveled ΔDT of the vehicle in the current processing cycle is calculated in a step 31 by multiplying a detected vehicle speed VP by a repetition period ΔT at which the present process is executed.

Next, the current traveled distance integrated value ΣDT is calculated by adding the calculated distance traveled ΔDT to the traveled distance integrated value ΣDT integrated up to the immediately preceding loop (step 32). Next, the estimated trapped dust amount QD is calculated by multiplying the calculated traveled distance integrated value ΣDT by a predetermined traveled distance coefficient KDT (step 33). The traveled distance coefficient KDT corresponds to an amount of dust trapped by the air cleaner 6 per unit distance traveled of the vehicle, and is empirically set in advance e.g. based on experimental results. In the above-described step 9 following the step 33, the decreased amount ΔRCL of the life parameter RCL is calculated using the calculated estimated trapped dust amount QD.

Further, when the reference value RCL0 of the life parameter RCL has been updated in the above-described steps 15 to 19, the traveled distance integrated value ΣDT is reset to 0 in a step 34. The remainder of the configuration of the variation process is the same as that of the FIG. 2 process.

As described heretofore, according to the above variation, since the life parameter RCL is calculated based on the traveled distance integrated value ΣDT, the life parameter RCL can be calculated using the vehicle speed VP detected by the vehicle speed sensor 26, and therefore it is possible to reduce the number of component parts and manufacturing costs of the end-of-life estimation device.

Figure 8:
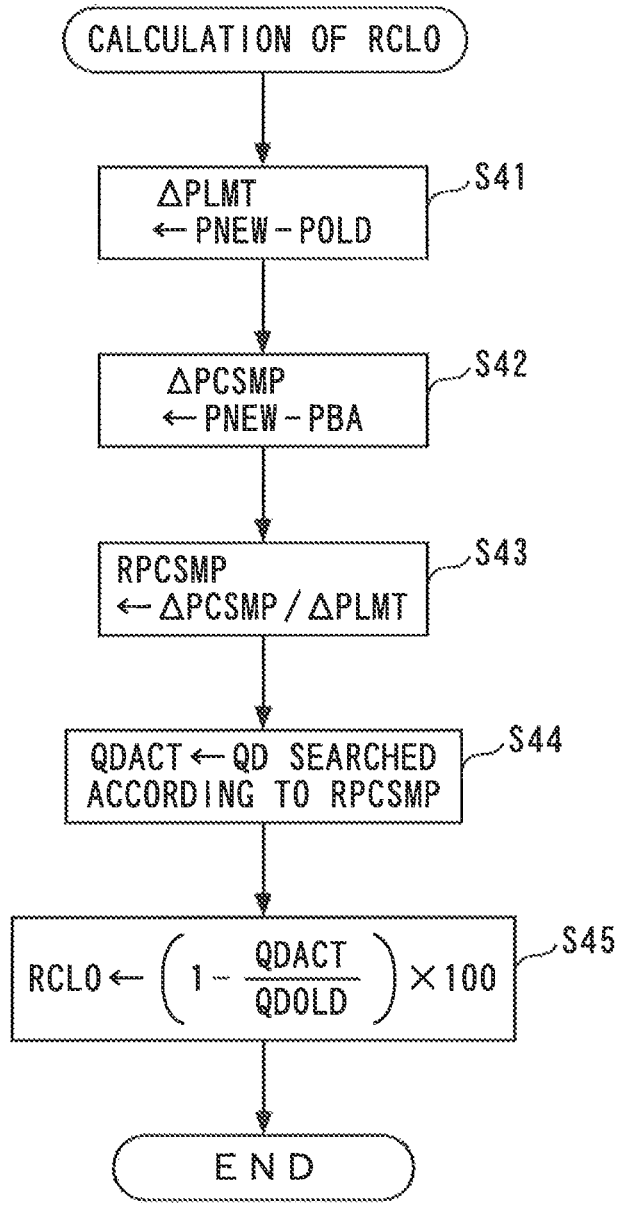
FIG. 8 is a flowchart of a calculation process for calculating a reference value of a life parameter, by another method.

Next, another calculation method for calculating the reference value RCL0 of the life parameter RCL will be described with reference to FIGS. 8 and 9. A calculation process shown in FIG. 8 is executed in place of the step 17 appearing in FIGS. 2 and 7.

In the present process, first, in a step 41, the difference between the new condition-time intake pressure PNEW and the end-of-life-time intake pressure POLE calculated in the above-described steps 15 and 16 (=PNEW−POLD) is calculated as a limit pressure loss ΔPLMT. Further, the difference between the new condition-time intake pressure PNEW and the detected intake pressure PBA (=PNEW−PBA) is calculated as a consumption pressure loss ΔPCSMP (step 42).

Next, a ratio between the calculated consumption pressure loss ΔPCSMP and the limit pressure loss ΔPLMT (=ΔPC- SMP/ΔPLMT) is calculated as a consumption pressure loss ratio RPCSMP (step 43). As is apparent from the above, the consumption pressure loss ratio RPCSMP corresponds to a ratio of a current pressure loss already caused up to the present time to a pressure loss to be caused when the air cleaner 6 has reached the end of the service life due to clogging of the air cleaner 6.

Figure 9:
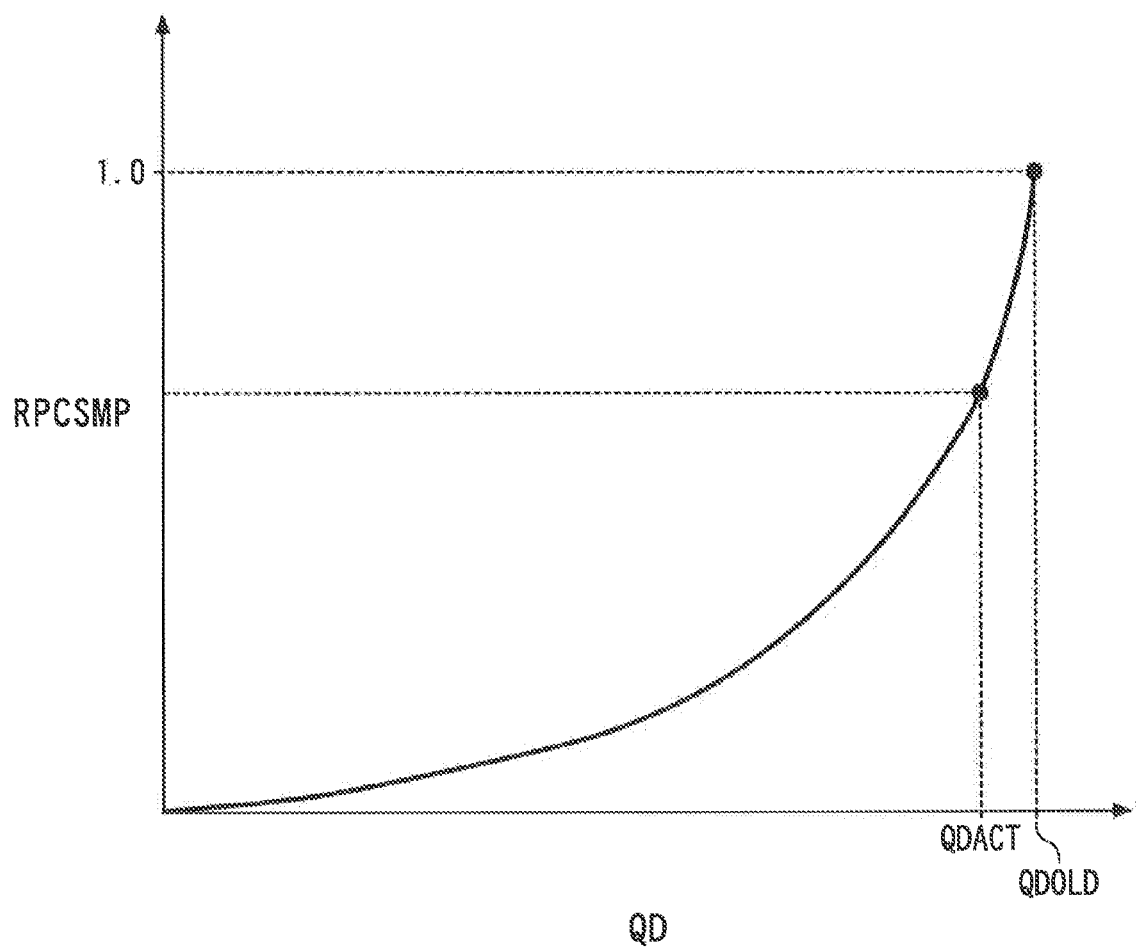
FIG. 9 is a map for use in calculation of an actual trapped dust amount in the calculation process in FIG. 8.

Next, the trapped dust amount QD is determined by searching a map shown in FIG. 9 according to the calculated consumption pressure loss ratio RPCSMP, and is calculated as an actual trapped dust amount QDACT at the present time point (step 44). It has been found out that a quadratic curve relationship, as shown in FIG. 9, holds approximately uniformly between the consumption pressure loss ratio RPCSMP defined as described above and the trapped dust amount QD of dust trapped by the air cleaner 6, e.g. irrespective of the limit pressure loss ΔPLMT which changes with the conditions of the throttle valve opening θTH and the intake air amount GAIR, and therefore, the above map is formed by empirically determining the quadratic curve relationship e.g. by experiment, and mapping the same.

Next, the reference value RCL0 of the life parameter RCL is calculated by the following equation (2) using the calculated actual trapped dust amount QDACT and the above-described predetermined limit dust amount QDOLD (step 45), followed by terminating the present process.

$$RCL0=(1-QDACT/QDOLD)\times 100 \qquad (2)$$

As described above, according to this calculation method, it is possible to calculate the reference value RCL0 and the life parameter RCL in a more fine-grained manner based on the trapped dust amount estimated from the pressure loss at the air cleaner 6, and therefore it is possible to more accurately estimate the end of the service life of the air cleaner 6.

Note that the present invention is by no means limited to the embodiments described above, but can be practiced in various forms. For example, although in the above-described embodiment, the reference value RCL0 of the life parameter RCL is calculated according to the intake air amount GAIR, the intake pressure PBA, and the throttle valve opening θTH, the reference value RCL0 may be calculated according to two of the parameters, i.e. the intake air amount GAIR and the intake pressure PBA, or the intake air amount GAIR and the throttle valve opening θTH. As described heretofore, if such two of the parameters are determined, the degree of clogging of the air cleaner 6 is approximately determined, and hence it is possible to accurately calculate the reference value RCL0 by using a combination of the above two parameters. Particularly in the case of an engine, such as a diesel engine, which is not provided with the throttle valve, the combination of the intake air amount GAIR and the intake pressure PBA is effective.

Further, although in the above-described embodiment, the reference value RCL0 of the life parameter RCL is calculated on condition (a) that the intake air amount GAIR is not smaller than the threshold value GREF, and condition (b) that the throttle valve opening θTH is not smaller than the threshold value θREF, the update of the reference value RCL0 may be performed only on condition (a) that the intake air amount GAIR is not smaller than the threshold value GREF. As described hereinabove, if at least the intake air amount GAIR is somewhat large, the amounts of change in the intake pressure PBA and the intake air amount GAIR become larger according to the degree of clogging of the air cleaner 6, and hence it is possible to ensure the accuracy of the reference value RCL0 only depending on the condition (a). Furthermore, although in the above-described embodiment, the reference value RCL0 is updated only once in one whole running cycle of the engine 3, it is to be understood that this frequency may be increased or decreased.

Further, although in the above-described embodiment, the decreased amount ΔRCL of the life parameter RCL is calculated according to the intake air amount integrated value ΣGAIR or the traveled distance integrated value EDT, this is not limitative, but the decreased amount ΔRCL may be calculated according to another suitable parameter, such as a fuel injection amount, the rotational speed of the engine 3, or an integrated value of the flow rate of exhaust gases, which reflects the degree of clogging of the air cleaner 6 which proceeds along with running of the engine 3 or the vehicle. Furthermore, the decreased amount ΔRCL and the reference value RCL0 may be calculated by other desired suitable methods than those used in the above-described embodiment.

Further, although in the above-described embodiment, it is determined whether or not the air cleaner 6 has reached the end of the service life, by comparing the calculated life parameter RCL with the threshold value ROLD, this is not limitative, but in place of the above or in addition to the above, it is also possible to display the life parameter RCL on a control panel of the vehicle or store the life parameter RCL in predetermined storage means to read out the life parameter RCL as required.

Furthermore, although in the above-described embodiment, the present invention is applied to the automotive gasoline engine, this is not limitative, but it can be applied to various engines other than the gasoline engine, e.g. a diesel engine, and further, it can be applied to engines other than the engines for a vehicle, e.g. engines for ship propulsion machines, such as an outboard motor having a vertically-disposed crankshaft. Further, it is possible to change details of the construction of the embodiment within the spirit and scope of the present invention.

It is further understood by those skilled in the art that the foregoing are preferred embodiments of the invention, and that various changes and modifications may be made without departing from the spirit and scope thereof.

What is claimed is:

1. An end-of-life estimation device for an air cleaner, which is disposed in an intake passage of an internal combustion engine, for estimating an end of a service life of the air cleaner that filters intake air drawn into the engine through the intake passage, which is dependent on clogging of the air cleaner, comprising:

life parameter-calculating means for calculating a life parameter indicative of a remaining service life of the air cleaner during running of the engine, on an as needed basis;

intake air amount-detecting means for detecting an intake air amount;

intake parameter-detecting means for detecting an intake parameter which is at least one of pressure of intake air on a downstream side of the air cleaner and an opening degree of a throttle valve for adjusting the intake air amount;

storage means for storing a relationship between a degree of clogging of the air cleaner, the intake air amount, and the intake parameter; and reference value-updating means for calculating and updating a reference value of the life parameter with reference to which said life parameter-calculating means calculates the life parameter, based on the relationship stored in said storage means, according to the intake air amount and the detected intake parameter, when the detected intake air amount is not smaller than a predetermined value, and wherein the reference value-calculating means calculates and updates the reference value repeatedly such that the life parameter and the reference value are corrected close to a true service life line extending from a value of the life parameter representing a new air cleaner to a predetermined value representing the end of life of the air cleaner.

2. The end-of-life estimation device as claimed in claim 1, wherein said intake parameter-detecting means detects the opening degree of the throttle valve as the intake parameter; and wherein said reference value-updating means updates the reference value when the intake air amount is not smaller than the predetermined value, and at the same time the detected opening degree of the throttle valve is not smaller than a predetermined opening degree.

3. The end-of-life estimation device as claimed in claim 2, further comprising intake air amount integrated value-calculating means for calculating an integrated value of the intake air amount, and wherein said life parameter-calculating means calculates the life parameter according to the calculated integrated value of the intake air amount.

4. The end-of-life estimation device as claimed in claim 2, wherein the engine is installed on a vehicle, as a motive power source;

the end-of-life estimation device further comprising traveled distance integrated value-calculating means for calculating an integrated value of a distance traveled of the vehicle, and wherein said life parameter-calculating means calculates the life parameter according to the calculated integrated value of the distance traveled of the vehicle.

5. The end-of-life estimation device as claimed in claim 1, further comprising intake air amount integrated value-calculating means for calculating an integrated value of the intake air amount, and wherein said life parameter-calculating means calculates the life parameter according to the calculated integrated value of the intake air amount.

6. The end-of-life estimation device as claimed in claim 1, wherein the engine is installed on a vehicle, as a motive power source;

the end-of-life estimation device further comprising traveled distance integrated value-calculating means for calculating an integrated value of a distance traveled of the vehicle, and wherein said life parameter-calculating means calculates the life parameter according to the calculated integrated value of the distance traveled of the vehicle.

* * * * *